United States Patent
Takacs (10) Patent No.: US 7,348,742 B2
(45) Date of Patent: Mar. 25, 2008

(54) LIGHTING FIXTURE WITH SYNCHRONIZABLE OPTICAL FILTER WHEEL AND RELATED METHOD

(75) Inventor: Laszlo A. Takacs, Lakewood, OH (US)

(73) Assignee: Energy Focus, Inc., Solon, OH (US)

( * ) Notice: Subject to any disclaimer, the term of this patent is extended or adjusted under 35 U.S.C. 154(b) by 344 days.

(21) Appl. No.: 11/186,556

(22) Filed: Jul. 21, 2005

(65) Prior Publication Data
US 2006/0109653 A1 May 25, 2006

Related U.S. Application Data

(60) Provisional application No. 60/630,313, filed on Nov. 23, 2004.

(51) Int. Cl.
*H02P 1/00* (2006.01)

(52) U.S. Cl. .................. 318/268; 318/567; 318/569

(58) Field of Classification Search ........... 318/268, 318/567; 362/293; 435/40.5; 382/128; 702/19; 378/569
See application file for complete search history.

(56) References Cited

U.S. PATENT DOCUMENTS

| | | |
|---|---|---|
| 1,715,067 A | 5/1929 | Jones |
| 2,203,358 A | 6/1940 | Koenig |
| 2,351,760 A | 6/1944 | Beers |
| 2,378,746 A | 6/1945 | Beers |
| 2,709,717 A | 5/1955 | Werenfels |
| 3,233,400 A | 2/1966 | Haydon |
| 3,302,014 A | 1/1967 | Moore et al. |
| 3,821,793 A | 6/1974 | Carson |

(Continued)

FOREIGN PATENT DOCUMENTS

JP   HEI-04-296489   10/1992

(Continued)

OTHER PUBLICATIONS

Applied Motion Products "Si-1 Motor Control," published by Applied Motion Products, Watsonville, CA (2 pages) on www.appliedmotionproducts.com, admitted as prior art, no date.

(Continued)

*Primary Examiner*—Karen Masih
(74) *Attorney, Agent, or Firm*—Charles E. Bruzga; Bruzga & Associates (57) ABSTRACT

A method of making an optical filter wheel of a device synchronizable with an internal, rotatable virtual reference wheel, created in a memory of a motor controller of the device, is disclosed. The method includes a single trigger event that initializes rotation of the virtual reference wheel. The controller determines the orientation of an optical filter wheel of the device and maintains an ongoing representation of said orientation over time. The controller controls the motor, which causes the filter wheel to become coincident with the virtual reference wheel after the trigger event. A self-contained light fixture is also disclosed, which includes an optical filter wheel driven by an electric motor that is synchronizable with an internal, rotatable virtual reference wheel of the fixture. The method and light fixture permits optical filter wheels of multiple light fixtures, which may be identical, to synchronize with one another.

13 Claims, 7 Drawing Sheets

U.S. PATENT DOCUMENTS

| | | |
|---|---|---|
| 3,949,213 A | 4/1976 | Paitchell |
| 4,322,632 A | 3/1982 | Hart et al. |
| 4,376,913 A | 3/1983 | Higby |
| 4,413,211 A | 11/1983 | Fowler |
| 4,480,197 A | 10/1984 | Hollaway |
| 4,488,092 A | 12/1984 | Chikuma |
| 4,682,276 A | 7/1987 | Miller |
| 4,700,110 A | 10/1987 | McNair et al. |
| 4,766,353 A | 8/1988 | Burgess |
| 4,794,271 A | 12/1988 | McNair |
| 4,802,073 A | 1/1989 | Plumly |
| 4,837,455 A | 6/1989 | Sleator |
| 4,896,079 A | 1/1990 | Tabor |
| 4,896,083 A | 1/1990 | Kopala et al. |
| 4,985,662 A | 1/1991 | Willcocks et al. |
| 5,394,309 A | 2/1995 | Brown |
| 5,477,113 A | 12/1995 | Christoffersson |
| 5,479,322 A | 12/1995 | Kacheria |
| RE35,220 E | 4/1996 | Johnson |
| 5,592,057 A | 1/1997 | Kordik |
| 5,610,448 A | 3/1997 | Dattilo |
| 5,689,261 A | 11/1997 | Mehta et al. |
| 5,720,056 A | 2/1998 | Aymes |
| 5,747,940 A | 5/1998 | Openiano |
| 5,779,353 A | 7/1998 | Kacheria |
| 5,808,423 A | 9/1998 | Li et al. |
| 5,942,814 A | 8/1999 | Sutterlin et al. |
| 5,980,076 A | 11/1999 | Dunn et al. |
| 6,002,216 A | 12/1999 | Mateescu |
| 6,379,025 B1 | 4/2002 | Mateescu et al. |
| 6,382,824 B1 | 5/2002 | Prasad et al. |
| 6,811,286 B2 | 11/2004 | Mateescu et al. |
| 2004/0029213 A1* | 2/2004 | Callahan et al. ............ 435/40.5 |

FOREIGN PATENT DOCUMENTS

JP    HEI-07-161478    6/1995

OTHER PUBLICATIONS

Fiberstars, Inc. "Synchronous Product Description/Installation Manual" for Models 401, 402, 404, 405(N), 501, 601—SM Master Illuminators (2 pages), printed on Jul. 13, 1999.

\* cited by examiner

LIGHTING FIXTURE WITH SYNCHRONIZABLE OPTICAL FILTER WHEEL AND RELATED METHOD

This application claims priority from U.S. Provisional Patent Application No. 60/630,313, filed on Nov. 23, 2004.

FIELD OF THE INVENTION

The invention relates to light fixtures having an optical filter wheel that is synchronizable with optical filter wheels of other light fixtures. The invention also relates to a method of making an optical filter wheel of one device synchronizable with optical filter wheels of other devices.

BACKGROUND OF THE INVENTION

Various methods have been proposed for causing separate light fixtures to emit time-changing modulation of light (e.g., color and/or intensity) in a synchronized fashion so that all the fixtures emit the same color-modulated or intensity-modulated light together. "Synchronization" or its variants means, in this specification and claims, synchronization of an optical filter wheel in space (position or orientation), time (simultaneity), and speed (angular rate of rotation).

One prior art method involves the steps of moving the optical filter wheels of multiple light fixtures to a home position after a trigger event, such as application of power to a light fixture. After a brief period of time during which all optical filter wheels are simultaneously at their home positions, all optical filter wheels are then rotated in synchrony by coordinating to a similar time reference. It would be desirable to provide a more sophisticated method for synchronizing optical filter wheels that avoids simultaneously placing all filters wheels at their home positions in the foregoing manner.

The following parts of this Background of the Invention describe various features required for making an optical filter wheel of a light fixture synchronizable with optical filter wheels of other light fixtures.

A "light fixture" in this specification and claims means either a fixture containing a light source that provides light to a target region to be illuminated either with the use of a fiberoptic light cable, or without the use of a fiberoptic light cable. Further, an optical filter wheel could contain segments that modify either the amplitude, or color spectrum, of transmitted light in some useful fashion. For modifying the color spectrum of light, optical filter wheels are typically, but not always, constructed of dichroic color filter segments.

A typical optical filter that only modifies the color of light, but not its intensity, is often referred to as, simply, a color wheel.

Time Coordination with Single Trigger Event & Subsequent Similar Timing

From study of various methods of causing separate light fixtures to emit time-changing filtered light in a synchronized fashion, the present inventor has determined the following, underlying principle: In order to achieve synchronization of emission of colored light among separate light fixtures, a single trigger event starts the synchronization process among all light fixtures. This is followed by subsequent similar timing within each light fixture.

One example of generating a trigger event is taught by U.S. Pat. No. 5,747,940 to Openiano, which does not involve a movable optical filter wheel. Openiano teaches a method of causing multiple time-varying light displays to become synchronized without the use of additional control wires. Openiano accomplishes this "by the simple expedient of applying primary [a.c.] power to all [light] arrays in common [i.e., at the same time]." Col. 5, Lines 8-13. This function of powering up all light arrays at the same time constitutes a single trigger event. The foregoing way of generating a trigger event by simultaneously powering up multiple light fixtures is preferred for use with the present invention.

Following the single trigger event taught by the foregoing patents, subsequent similar timing is employed in each light fixture to maintain synchrony among multiple lighting devices. Such similar timing may employ the simple expedient of synchronizing motors for optical filter wheels in the various light fixtures to the periodic information inherent in a common a.c. power source. Patents teaching such use of the periodic information inherent in a common a.c. power source, for synchronizing a pair of color wheels, include U.S. Pat. Nos. 3,821,793, 2,709,717 and 2,378,746.

Another method to achieve subsequent, similar timing for each light fixture, which is periodic, is to use the universal time coordination signals broadcast by the US Government through radio station WWV. This is the method taught by U.S. Pat. No. 4,234,958 to Pipes et al.

Spatial Sensing

Any technique that can spatially synchronize an optical filter wheel should be able to sense the position, or orientation, of the wheel. Commonly used techniques for this purpose use an optical encoder, magnetic sensor, or electromechanical switch. The synchronization technique for optical filter wheels described herein may use any of these, or another technique to sense wheel position. A preferred technique herein uses a magnetic sensor.

Remembering the Wheel's Position on Power-Up

To complement the wheel's position sensor, non-volatile memory, such as EEPROM, may be used to remember the wheel's position at power-down. This information may be used on a subsequent power-up to speed the re-synchronization procedure.

SUMMARY OF THE INVENTION

A preferred embodiment of the invention provides a method of making an optical filter wheel of a device synchronizable with an internal, rotatable virtual reference wheel that is created in a memory of a motor controller of the device. The method includes a single trigger event that initializes rotation of the virtual reference wheel. The controller determines the orientation of an optical filter wheel of the device and maintains an ongoing representation of said orientation over time. The controller controls the motor, which causes the filter wheel to become coincident with the virtual reference wheel after the trigger event. A self-contained light fixture is also disclosed, which includes an optical filter wheel driven by an electric motor that is synchronizable with an internal, rotatable virtual reference wheel of the fixture. The inventive method and light fixture permits optical filter wheels of multiple light fixtures, which may be identical, to synchronize with one another.

The foregoing invention causes synchronization of optical filter wheels in a more sophisticated manner than the above-described method of first moving all wheels to a home position at which all wheels remain stationary for some duration. By way of example, a preferred aspect of the present invention causes continual movement of an optical filter wheel that may move in both forward and reverse directions. Various benefits of the present invention will become apparent from the following description.

DETAILED DESCRIPTION OF THE INVENTION

Figure 1:
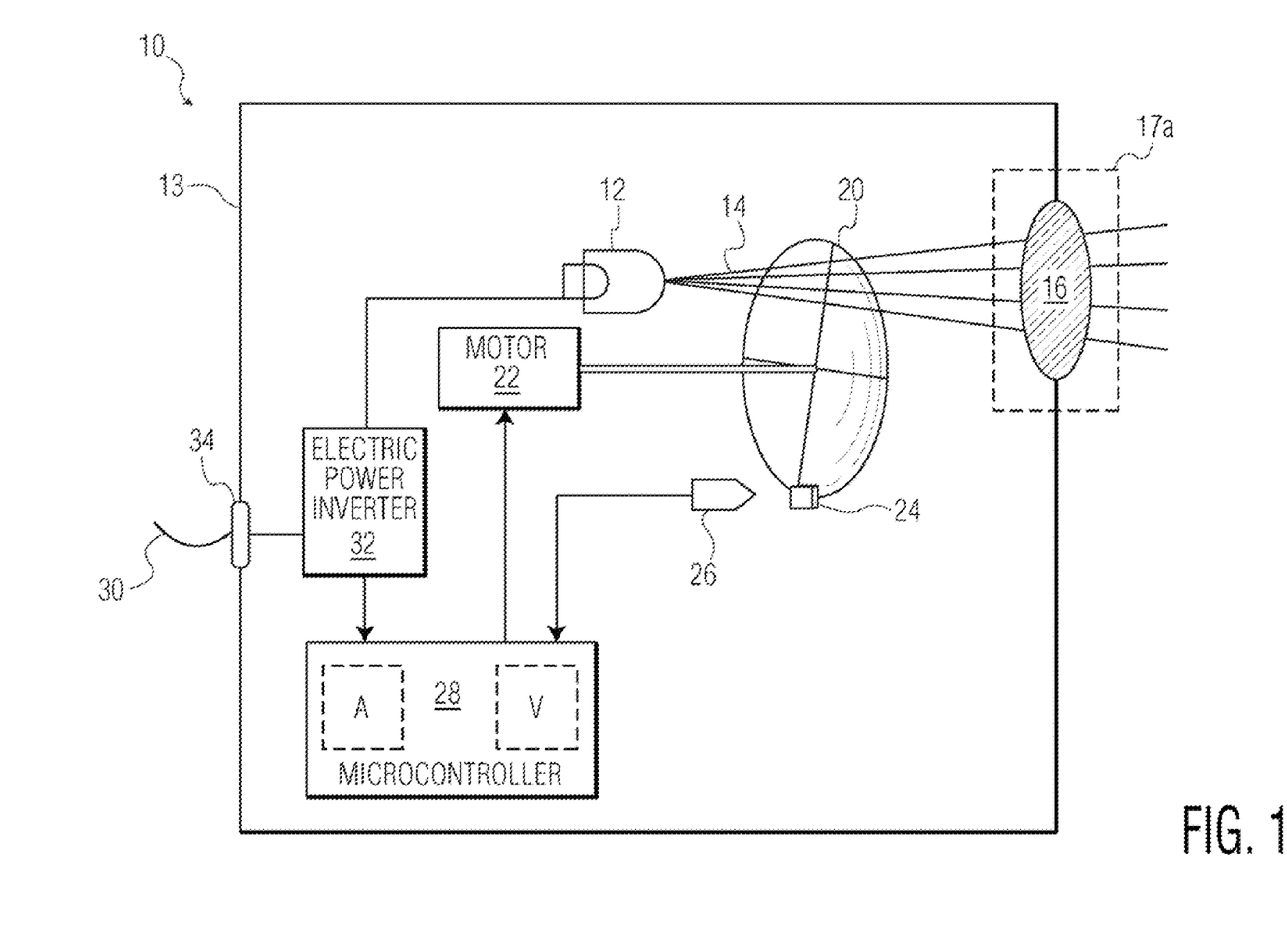
FIG. 1 is a simplified, schematic view of an underwater light fixture incorporating features of the present invention.
Figure 2:
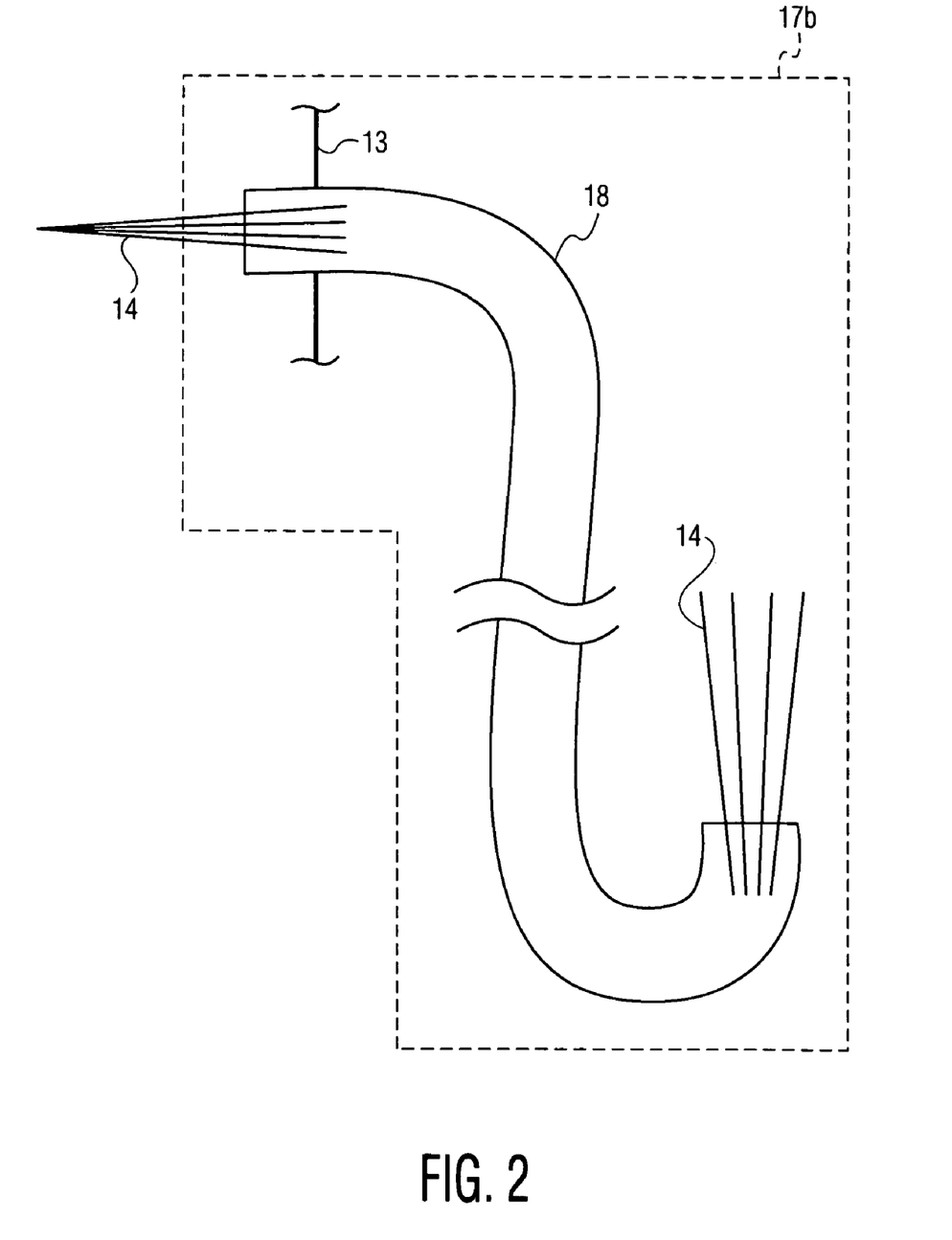
FIG. 2 is a simplified view of a fiberoptic cable and a portion of a housing wall of FIG. 1.

As shown in FIG. 1, a lamp 12 within a waterproof housing 13 directs light 14 through a lens 16 via an optical filter wheel 20. As an alternative to lens 16, such lens and housing wall structure within dashed-line box 17a may be replaced by the structure shown in FIG. 2 in dashed-line box 17b; that is, a fiberoptic cable 18 shown with incoming and outgoing light 14. Color wheel 20, shown simplified, may be a multi-segmented color wheel using dichroic filters. Color wheel 20 is driven by a motor 22, such as a stepper motor. The position of filter wheel 20 is determined by a magnet 24 on the wheel and a cooperating magnetic sensor 26 having an output fed into a microcontroller 28. A power cable 30 supplies electrical power to an electric power inverter 32, which, in turn, supplies power to microcontroller 28 and lamp 12. A grommet 34, shown schematically, provides a seal between cable 30 and lamp housing 13.

Microcontroller 28 controls filter wheel motor 22 in association with position-sensing magnet 24 and sensor 26. Microcontroller 28 includes an A register and a V register, as shown. The V register represents a rotatable virtual wheel that has the desired angular location of actual filter wheel 20. The A register contains the known angular location of actual wheel 20. When magnet 24 on the filter wheel aligns with sensor 26, the wheel is deemed at zero degrees. Use of the A and V registers will be discussed after first considering a graphical example of synchronization and state diagrams of preferred operation.

Preferably, microcontroller 28 controls motor 22 to cause filter wheel 20 to assume a position and velocity coincident with the virtual wheel usually some moments after occurrence of a single trigger event.

Timed Power Interruption

The mentioned trigger event may be the single event of the conclusion of an interruption of power to the light fixture. That is, the power to the light fixture may be turned off and then back on within a small period of time (e.g., 1.5 seconds). Turning the power back on after briefly being off concludes the timed power interruption, and constitutes a single trigger event.

Graphical Example of Synchronization

Figure 3:
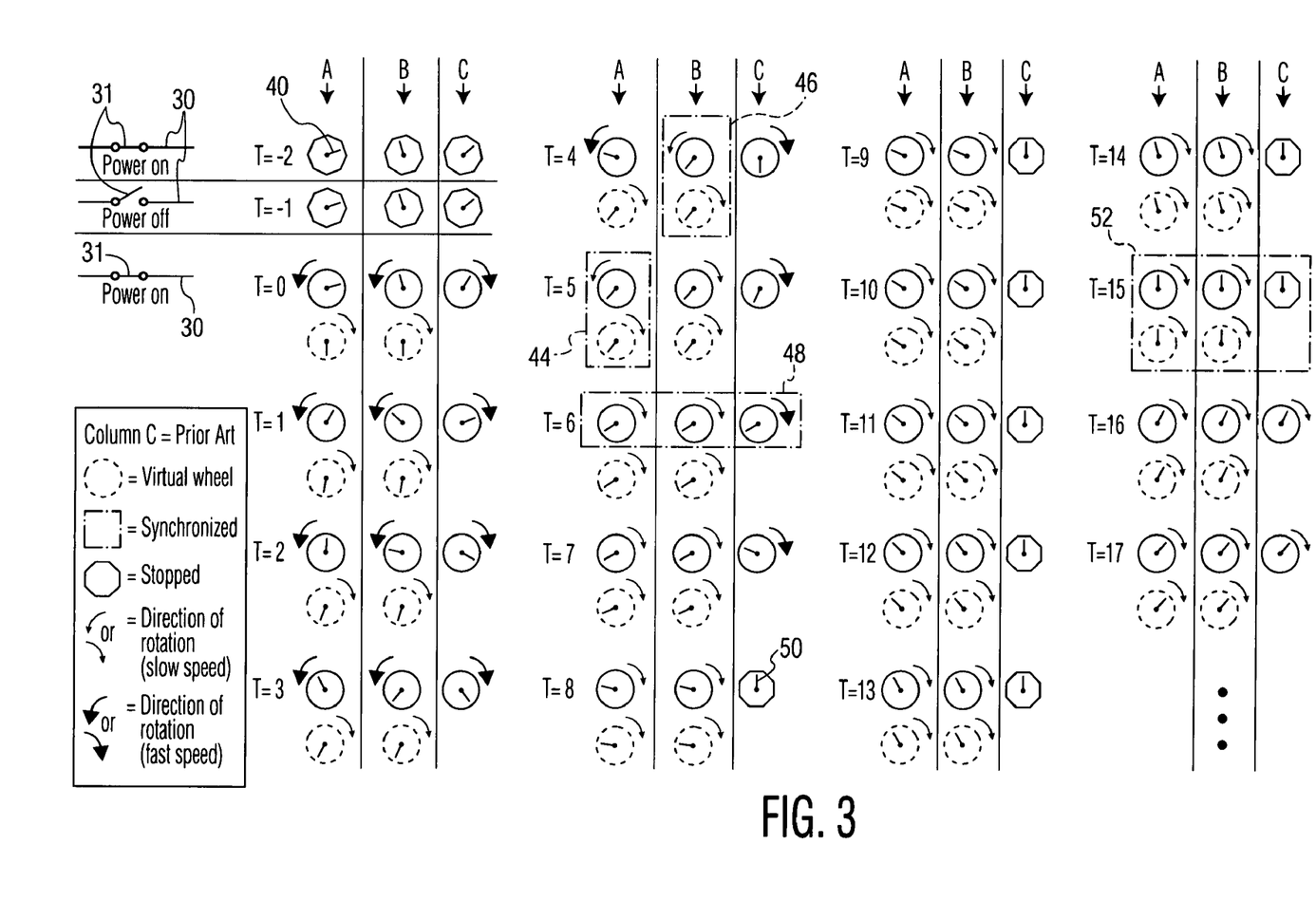
FIG. 3 is a time-sequence chart showing positions and movements of optical filter wheels versus time in association with virtual wheels in Columns A and B, and in association with a prior art optical filter wheel in Column C.

The time-sequence chart of FIG. 3 graphically shows one mode of operation of the synchronization technique of the present invention. Columns A and B of FIG. 3 portray filter wheels in accordance with the invention, with the assumption, by way of example, that each filter wheel is associated with an identical light fixture 10 as shown in FIG. 1. (The light fixtures need not be identical.) At time ("T")=−2 seconds, power is being supplied to the light fixture, according to a closed switch 31 in power line 30. Power line 30 is the same as power line 30 shown in FIG. 1. At this time, the wheels in Columns A and B are stopped in random positions. Relative positions of the wheels are noted by schematic lines (e.g., 40) in the wheel of Column A at T=−2 seconds, which may be likened to the hour hand in an analog clock.

At T=−1 second, a timed power interruption begins. Switch 31 in power line 30 is opened, and the wheels in Columns A and B are still stopped. Then, at T=0 seconds, switch 31 is closed, which concludes a timed power interruption, as mentioned above, and constitutes a trigger event. As shown just below the wheels at T=0 seconds, respective virtual wheels both start turning from the identical spatial positions in a clockwise (CW) direction at the same, relatively slow speed. At the same time, the actual wheels in Columns A and B start turning at the same, relatively fast speed, but in a counterclockwise (CCW) direction. Typically, the fast speed of the actual wheels in Columns A and B might be 3 times as fast as the slow speed rotation of the associated virtual wheels. The directions CW and CCW are arbitrary conventions in this specification. Direction CCW is arbitrarily chosen to be the normal forward direction of a virtual or actual wheel.

At T=5 seconds, a phantom-line box 44 indicates coincidence of spatial positions of actual and virtual wheels in Column A. At this moment, though not shown, the actual wheel changes direction almost instantly (e.g., within about 60 milliseconds) and becomes coincident in spatial orientation, rotational direction and speed with the virtual wheel. As for the actual and virtual wheels in Column B, a similar moment of coincidence in spatial position, followed by almost instant coincidence in direction and speed, occurs at T=4 seconds. This is shown by phantom-line box 46.

As can be appreciated from the above discussion of FIG. 3, the actual wheels of columns A and B are synchronized with each other at T=5 seconds. This is because each actual wheel becomes coincident in spatial position, direction and speed with its associated virtual wheel. Since the virtual wheels are each triggered into (virtual) motion by the same trigger event—here, the conclusion of a timed power interruption—, the actual wheels of Columns A and B are synchronized with each other.

To assure continued synchronization of actual wheels of Columns A and B, the associated virtual wheels will be operated with similar timing. The Background of the Invention above sets forth various methods for achieving similar timing, and other methods will be apparent to those of ordinary skill in the art based on the present specification. The similar timing can also be modulated, if desired, such as by allowing the virtual wheel to operate with a velocity profile which is not a constant but changes with time.

Various advantages of the embodiment of the invention of Columns A and B of FIG. 3 will become apparent by contrasting the behavior of a prior art actual optical filter wheel of Column C. A timed power interruption as shown in FIG. 3, in connection with switch 31 in power line 30, also applies to the wheel of Column C. At T=−2 seconds and at T=−1 second, the wheel in Column C is at a stopped, random position. At T=0 seconds, the wheel in Column C starts turning at a fast speed clockwise. At T=6 seconds, the actual wheels of each of Columns A, B and C are spatially coincident, as noted in phantom-line box 48. However, because the wheel in Column C is moving at a faster speed that the wheels in Columns A and B, the actual wheels are not coincident in speed at that time.

The wheel in Column C continues turning until T=8 seconds, when the schematic line 50 points straight upwards. This position is customarily referred to as a home (or index) position, and relates to the prior art technique of synchronization being discussed. From T=8 seconds until T=15 seconds, the wheel in Column C remains stopped. This allows optical filter wheels from other light fixtures that use the prior art synchronization technique to all also reach a home position.

At T=15 seconds, as shown within phantom-line box 52, all actual wheels in Columns A, B and C are coincident in spatial position. At that moment, the wheel in Column C starts turning with speed and direction coincident with that of the wheels in Columns A and B. All actual (and virtual) wheels from that point on (until stopped) may then be synchronized in spatial position, speed and direction. This shows that the present synchronization technique for Columns A and B can be used in conjunction with a light fixture using the prior art synchronization technique of Column C, provided that the synchronization processes all commence from the same trigger event and employ subsequent similar timing.

In addition to the techniques for achieving subsequent similar timing mentioned in the Background of the Invention, three other techniques are: (1) use of a quartz crystal oscillator with microprocessor 28 of FIG. 1; (2) use of a variable-frequency AC power source as a time-base input to the microprocessor; or (3) use of broadcast television signals as a time-base input to the microprocessor. Other techniques of achieving subsequent similar timing will be apparent to persons of ordinary skill in the art based on the present specification.

The foregoing discussion of FIG. 3 also shows that the present synchronization technique of Columns A and B typically results achieving synchronization in less time than the prior art technique of Column C. Additionally, in the synchronization technique of Columns A and B, the actual wheels continue to rotate from their start of motion and, of course, past their moment of synchronization with each other at T=−5 seconds. This continuous motion is beneficial to prevent small plastic (e.g., Nylon) gears (not shown) associated with motor 22 (FIG. 1) from binding or deforming when operated in a hot environment resulting from waste heat from lamp 12. Thus, the lamp may inadvertently heat the plastic gears to a temperature of 80-90 C, which causes them to plastically deform and become flattened from a normal circular shape. Once flattened, such gears may bind, resulting in loss of motion of the associated optical filter wheel. However, using the technique of continuous movement of a filter wheel during synchronization with other optical filter wheels prevents the foregoing gear-binding problem and loss of wheel motion.

In contrast, as can be seen from the prior art Column C, the actual wheel starts moving and then remains stopped for seven seconds (from T=8 seconds until T=15 seconds). This period of time, which can typically increase to up to about 15 seconds for a wheel that starts closer to a home position than the wheel shown in Column C, increases the likelihood of gear sticking and loss of wheel motion. That is, the more time the plastic gears rest against each other at high temperature, the more likely it is that they will bind or deform. In contrast, the technique of continuous motion of the embodiment of Columns A and B avoids a prolonged period of time of the plastic gears resting against each other, and overcomes the problems of the gears binding or deforming.

State Diagram—General

Figure 4:
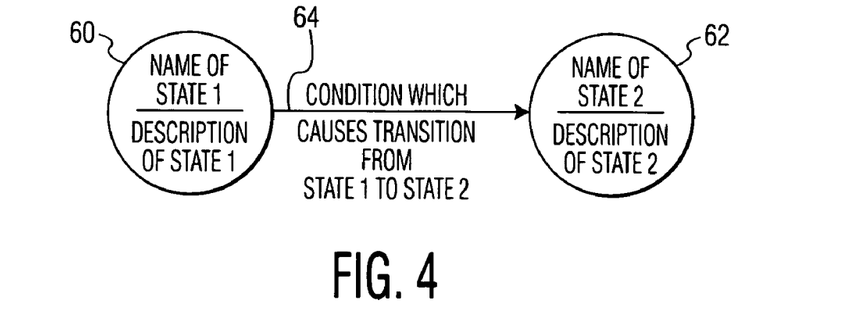
FIG. 4 is a legend for the state diagrams of subsequent FIGS. 5 and 6.
Figure 5:
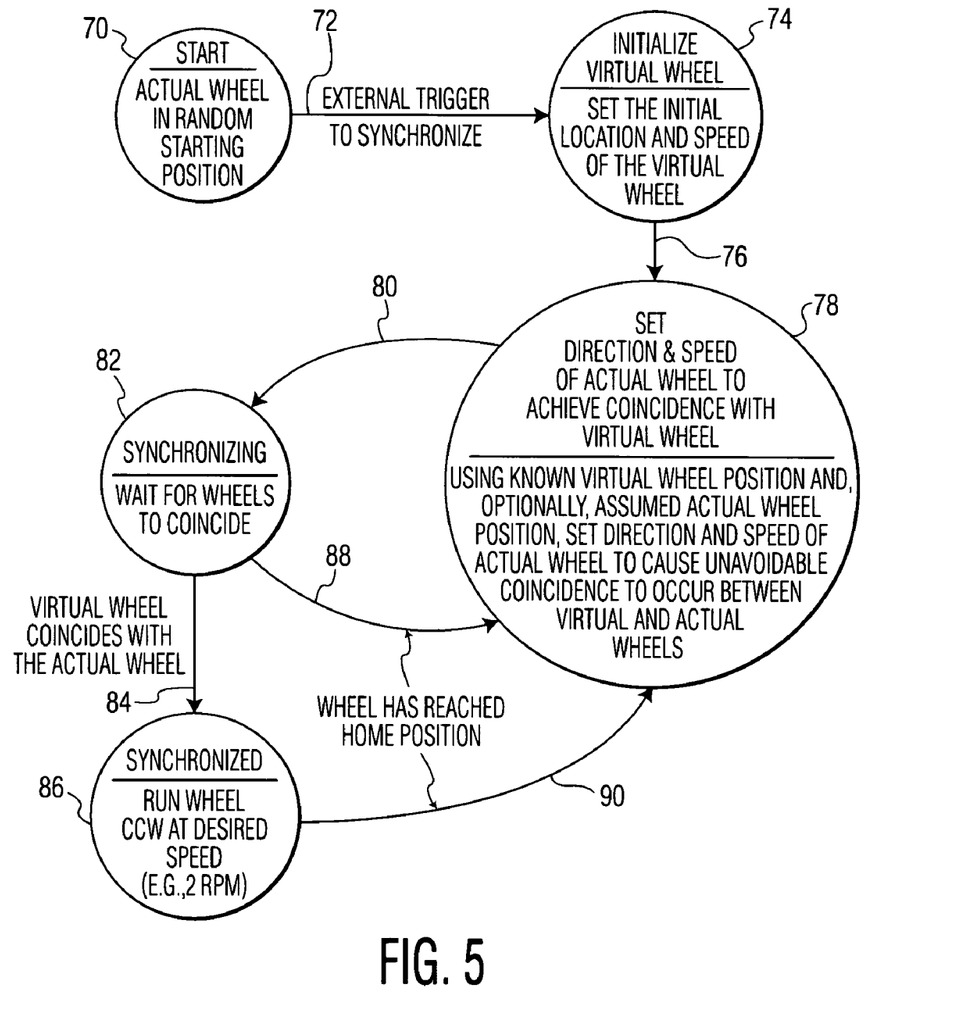
FIG. 5 is a state diagram showing a general mode of operation of the present invention.
Figure 6:
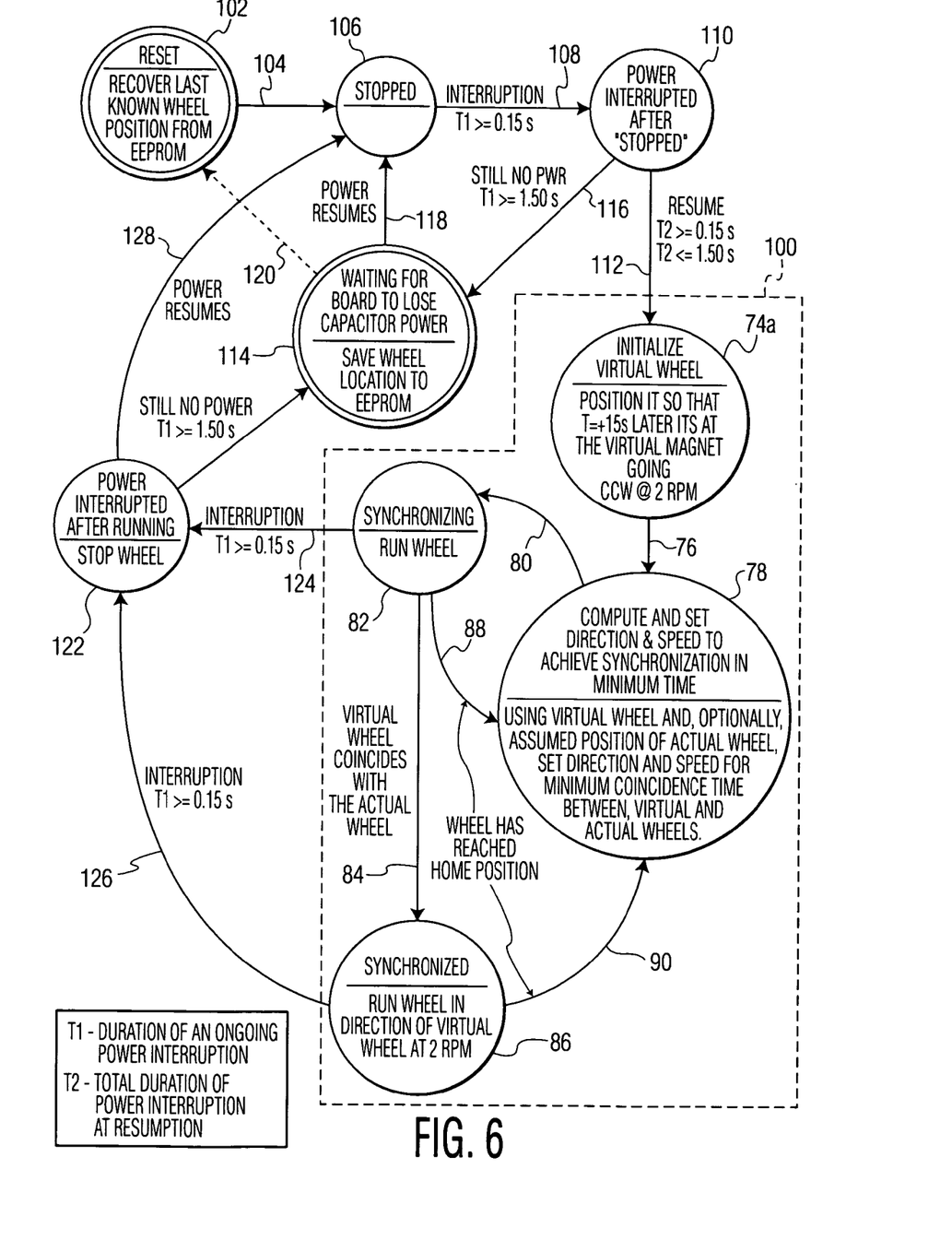
FIG. 6 is a state diagram showing one preferred mode of operation of the present invention.

FIG. 4 shows a legend for the state diagrams of FIGS. 5 and 6. In FIG. 4, the upper portion of circles 60 and 62 names a respective state of operation of a system (e.g., synchronization), while the bottom portion of such circles 60 and 62 provide an optional description of the associated state of operation. An arrow 64 pointing from circle 60 to circle 62 may include associated text, if necessary, to explain a condition that causes transition from State 1 of circle 60 to State 2 of circle 2. For convenience hereinafter, circle 60, for instance, will be referred to as State 60; that is, the number of a state will be given by the reference numeral in the drawing pointing to the circle for that state.

FIG. 5 shows a state diagram of a general mode of operation of the present invention. State 70 relates to an actual optical filter wheel being in a random starting position. An external, single trigger event associated with arrow 72 starts the process of synchronization for optical filter wheels of multiple light fixtures. Each light fixture may operate according to the state diagram of FIG. 5, but not all light fixtures need to operate according to such state diagram.

The trigger event associated with arrow 72 causes a State 74 to occur, in which the initial spatial location and speed of a virtual wheel is initialized. An ar row 76 leads to State 78 in which the direction and speed of an actual optical filter wheel is set to achieve coincidence with the virtual wheel. Arrow 80 leads to State 82 in which the process of the actual wheel synchronizing with the virtual wheel occurs.

An arrow 84 leads from synchronizing State 82 to State 86 of synchronizing being achieved, at which point the actual wheel may be run in synchrony with the virtual wheel. For instance, if the virtual wheel is running counterclockwise (CCW) at 2 RPM, the actual wheel will then also turn in the same direction, and at the same speed.

Another arrow 88 leads from synchronizing State 82 back to State 78 when the actual wheel has reached a home or index position (i.e., when magnet 24 of FIG. 1 aligns with sensor 26). At the home position, preferably again the direction and speed of the actual wheel is determined to achieve coincidence with the virtual wheel. In this manner, if arrow 88 is followed, aberrations in the speed of the actual wheel can be compensated by operating in State 78. State 78 is also reached by following arrow 90 from State 86.

State Diagram—Preferred Embodiment

FIG. 6 shows a state diagram of one preferred mode of operation of the present invention. States and transitional arrows corresponding to the general state diagram of FIG. 5 are enclosed with dashed-line box 100. The additional states and transitions relate to the employment of a trigger event constituting a timed power interruption, as described above, and to the use of memory to remember the last known position of an actual wheel upon powering down a light fixture.

The Reset State 102 recovers the last known wheel position from memory, which preferably is non-volatile memory, such as EEPROM. Arrow 104 leads to Stopped State 106, in which both the actual and virtual wheels are stopped. Arrow 108, occurring after an interruption of power (as discussed above in connection with FIG. 3, for instance) of T1 (see legend) of greater than 0.15 seconds, for instance, leads to State 110 in which the power is interrupted after the Stopped State 106. If power is resumed within 1.5 seconds, so that the total duration of power interruption, T2, is less than 1.5 seconds, for instance, Initialization of Virtual Wheel State 74a is reached. State 74a corresponds to State 74 of FIG. 5 as discussed above. Since State 74a is within box 100, corresponding to the general state diagram of FIG. 5, reference is made to the above discussion of FIG. 5 for details. However, State 74a does mention a preferred mode of operation such that at T=+15 seconds later, the virtual wheel is at a virtual magnet—or position corresponding to the actual wheel having its magnet aligned with an associated sensor, in which the wheel is at the home position. Additionally, at T=+15 seconds later, the virtual wheel is preferably rotating CCW at 2 RPM.

From the Power Interrupted State 110, if the timed interruption exceeds 1.5 seconds, for instance, State 114 is reached as indicated by arrow 116, in which the system waits for a capacitor (not shown), for instance, on a circuit board to lose power. The function of the capacitor is to provide sufficient power to keep the microprocessor functioning for a short period of time, long enough to determine that a power interruption of 1.5 seconds, for instance, may or may not have elapsed. The selection of the mentioned capacitor and incorporation suitable circuitry associated with the microprocessor will be apparent to persons of ordinary skill in the art based on the present specification. Preferably, in State 114, the location of the actual wheel—which is now stopped—is saved to memory, such as EEPROM.

From State 116, when power resumes, arrow 118 leads back to Stopped State 106. Additionally, the saved location of the actual wheel is recovered in Reset State 102. Transition 118 is taken if power resumes while the capacitor mentioned in the foregoing paragraph is able to keep the circuit powered up through the duration of a power interruption. Transition 120 is an implicit transition that does not actually occur in programmed logic. It applies to the case when the capacitor power to the microprocessor was lost because a power interruption lasted too long for the capacitor to keep the circuit alive. Transition 120 is actualized by the fact of the device resetting itself to state 102 when the power is eventually restored.

A Power Interrupted State 122—relating to a second power interruption—is reached from either of Synchronizing State 82 or Synchronized State 86, if according to arrows 124 and 126, a power interruption of greater than, preferably, 0.15 seconds occurs. This second power interruption differs from that of arrow 108 prior to synchronization occurring. Rather, the power interruption of arrows 124 and 126 is used for stopping optical filter wheels on the same color. From Power Interrupted State 122, Stopped State 106 is reached by arrow 128 which represents a resumption of power following the interruptions of either 124 or 126.

Role of A and V Registers

Figure 7:
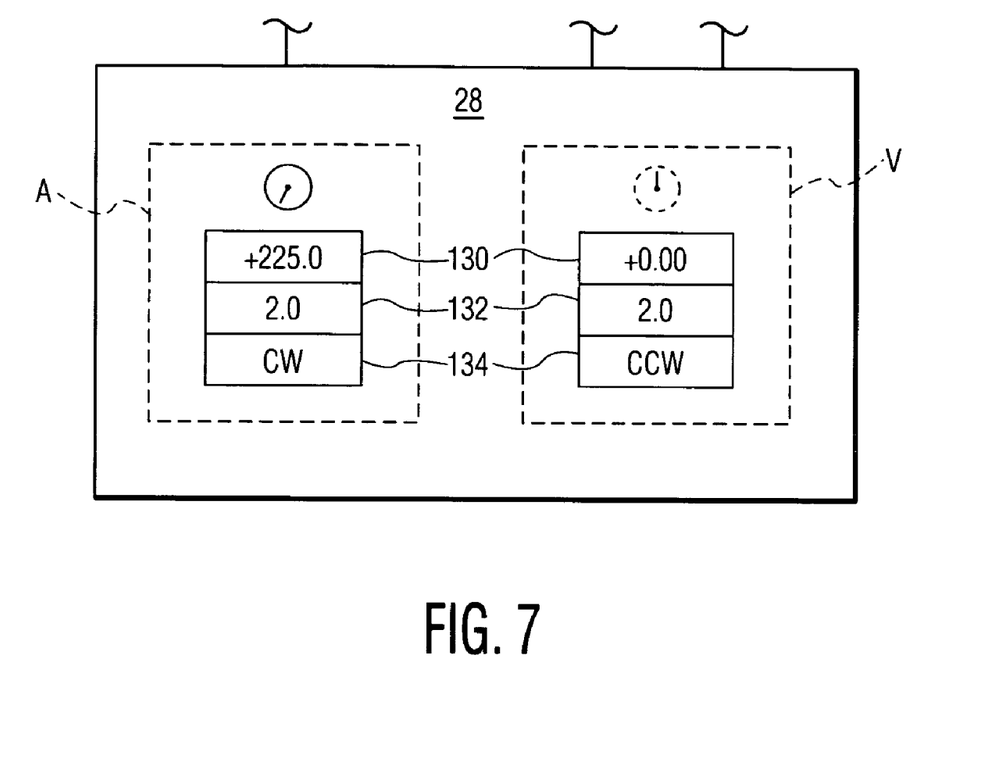
FIG. 7 is a simplified, schematic view of a microprocessor of FIG. 1.

Returning to consideration of the A and V registers of microprocessor 28, FIG. 7 illustrates typical contents of such registers. Typical contents for each register include angles 130 of actual and virtual wheels, speed 132 of actual and virtual wheels, and directions 134 of actual and virtual wheels.

In one particularly preferred implementation of the invention, at the conclusion of the first, timed power interruption after powering up a light fixture, the V register is initialized to a particular starting angular value "I" (not shown) and is thereafter incremented at a rate that corresponds to a 2 RPM counterclockwise (CCW) rotation. This corresponds to the desired location, speed and direction that is desired for the actual wheel at any given time.

Additionally, at the conclusion of the mentioned timed power interruption, an actual optical filter wheel is caused to rotate at some speed, such as 6 RPM in whichever of the clockwise (CW) or counterclockwise (CCW) directions is the fastest way to obtain synchronization. When the magnet (24, FIG. 1) passes in front of the sensor (26, FIG. 1), then the A register is set to zero and thereafter decremented so that the A register then indicates the actual location of the backward-moving wheel.

When the value of the A and V registers coincide, then the direction of the actual wheel's rotation is abruptly reversed and it proceeds to rotate CCW at 2 RPM. The actual wheel is now tracking the V register, which is the desired location, speed and direction of the actual wheel.

If the foregoing procedure is followed for multiple light fixtures, and each fixture is powered up simultaneously, the colors, etc., emitted by each fixture will eventually synchronize if each fixture has the same time-varying value of the virtual wheel in the V register. The "trigger event" in this scenario is the simultaneous powering up of each light fixture.

Example Software Implementation

The following psuedocode describes an exemplary way of implementing the synchronization function assuming that the sensor and motor are polled or driven by an interrupt service routine and status is checked or set via bit flags from the main routine. The initial angular value of position of the rotatable virtual wheel of 180 degrees may be chosen to conveniently interoperate with older model devices such as described in connection with prior art Column C in FIG. 3 above. The angle of the virtual wheel is assumed to be measured CW from a 12 o'clock hour-hand position of a clock (i.e., vertically straight up).

Psuedocode Beginning:

---

Program Title: Initiate Synchronization
Set "Synchronized" flag to "False"
Set "virtual wheel (desired) position" to 165 degrees
Mark "actual wheel's known position" as "Unknown"
Initiate 2 RPM CW rotation of actual wheel
Initiate 2 RPM CCW rotation of "virtual wheel (desired position of actual wheel)"
    (To do this, advance the desired position register by 12
    degrees/second using interrupt service routine)
LOOP UNTIL "Synchronized flag" = "True"
    IF "sensor detects magnet" THEN
        Set "actual wheel's known position" to 0 Degrees
        Mark "actual wheel's known position" as "Known"

-continued

```
        Initiate 2 RPM CW rotation of actual wheel's known position
            (i.e. advance register 12 degrees/second)
        END IF
    IF "actual wheel's known position" is marked "Known" THEN
        IF "actual wheel's desired position" = "actual wheels'
        known
        position" THEN
            Reverse actual wheel rotation from CW to CCW
            Set "Synchronized" flag to "True"
        END IF
    END IF
END LOOP
RETURN
```

Psuedocode End.

The foregoing psuedocode illustrates only one possible embodiment. The actual wheels from various light fixtures could also stop and wait rather than sequentially rotate in two directions, or they could move with a multiplicity of speeds, or indeed through a continuum of speeds and directions.

Stopped-Rotation Embodiment

In an embodiment in which the actual wheels from various light fixtures stop and wait, synchronization of an actual wheel with a rotatable, virtual reference wheel can be achieved in the following manner.

For clarity of illustration, assume two or more a light fixtures whose actual wheels are in respective random orientations at the conclusion of the first, timed power interruption power after the fixtures are powered up. With reference to FIG. 7, each fixture contains two indicators of angular position in respective registers A and V. The V register represents a virtual wheel and has the desired angular location of the actual wheel. The A register contains the known angular location of the actual wheel. The magnetic sensor position is assumed to correspond to zero degrees.

At the conclusion of a first timed power interruption after a light fixture is powered up, the V register is initialized to a particular starting angular value "I" and is thereafter incremented at a rate that corresponds to a 2 RPM CCW rotation. This represents the desired location of the actual wheel.

Also at the conclusion of the mentioned, timed power interruption, the actual wheel is caused to remain still. The microcontroller (28, FIGS. 1 and 7) preferably determines the position of the actual wheel by looking it up in its non-volatile memory immediately after fixture power-up. In this embodiment, the wheel location is assumed to be stored in the controller's memory when power was previously disconnected from the controller at fixture power-down.

When the actual location of the wheel (contained in register A) and the moving virtual position (contained in the V register) coincide, then the actual wheel is started rotating in the correct direction at 2 RPM. The wheel is now tracking the V register, which is its desired movement.

Provided that a multiplicity of such fixtures share the same trigger event, they will eventually synchronize with one another because each fixture has the identical time-varying value of the virtual wheel V. The event of concluding a first timed power interruption after powering up the light fixtures simultaneously is a trigger event in this embodiment.

Continuum-of-Speeds Embodiment

Modern motor controllers are capable of controlling motor rotation through a continuous range of speeds with great positional accuracy. A particularly versatile type of motor for executing this sort of precise motion is known as a stepper motor. In an embodiment in which the actual wheel, driven by a stepper motor, takes on a range of velocities, synchronization of an actual wheel with a rotatable, virtual reference wheel can be achieved in the following way.

For clarity of illustration, assume two or more light fixtures whose wheels are in a random orientation at the conclusion of the first, timed power interruption after the light fixture is powered up. Each fixture contains two angular position indicators or registers A and V, as shown in FIGS. 1 and 7. The V register, representing the virtual wheel, contains the desired angular location of the wheel. The A register contains the known angular location of the actual wheel. The magnetic sensor position is assumed to correspond to zero degrees.

At the conclusion of the first, timed power interruption after the light fixture is powered up, the V register is initialized to a particular starting angular value "I" and is thereafter incremented at a rate that corresponds to a 2 RPM CCW rotation. This represents the desired movement of the actual wheel.

Also, as soon as the power is cycled on, the wheel is caused to rotate with any velocity other than that of V, the virtual rotating reference wheel. This velocity need not be constant, but may in fact be a time-changing velocity (i.e., acceleration) profile, which is readily accomplished using a stepper motor/controller.

The microcontroller initially assumes the position of the stationary actual wheel by looking it up in its non-volatile memory immediately after power-up. The true position is eventually verified for a moving, actual wheel when a magnetic sensor (e.g., 26, FIG. 1) detects the proximity of a magnet (e.g., 24, FIG. 1) on the actual wheel. If the initial position assumption was incorrect—perhaps because the wheel was moved by a manual lamp maintenance operation which the controller did not record—then the true position is soon ascertained by the moving wheel/sensor combination.

Because the A and V registers do not increment their angles at the same speed, they will eventually coincide. This is a mathematical statement of the simple notion that two wheels turning at different rates will eventually become aligned—that is, the wheels will have the same angular orientation.

When the actual location of the actual wheel (contained in register A) and the moving virtual position contained in the V register coincide, then the velocity of the actual wheel is controlled to have the correct direction at 2 RPM. At this point, the actual wheel is now tracking the V register, which is the desired movement of the actual wheel.

Provided that a multiplicity of such fixtures share the same trigger event, they will eventually synchronize with one another because each fixture has the identical time-varying value of the virtual wheel V. The event of concluding a first timed power interruption after powering up the light fixtures simultaneously is a trigger event in this embodiment.

Embodiment to Mimic Special Movement of Prior Color Wheel

Figure 8:
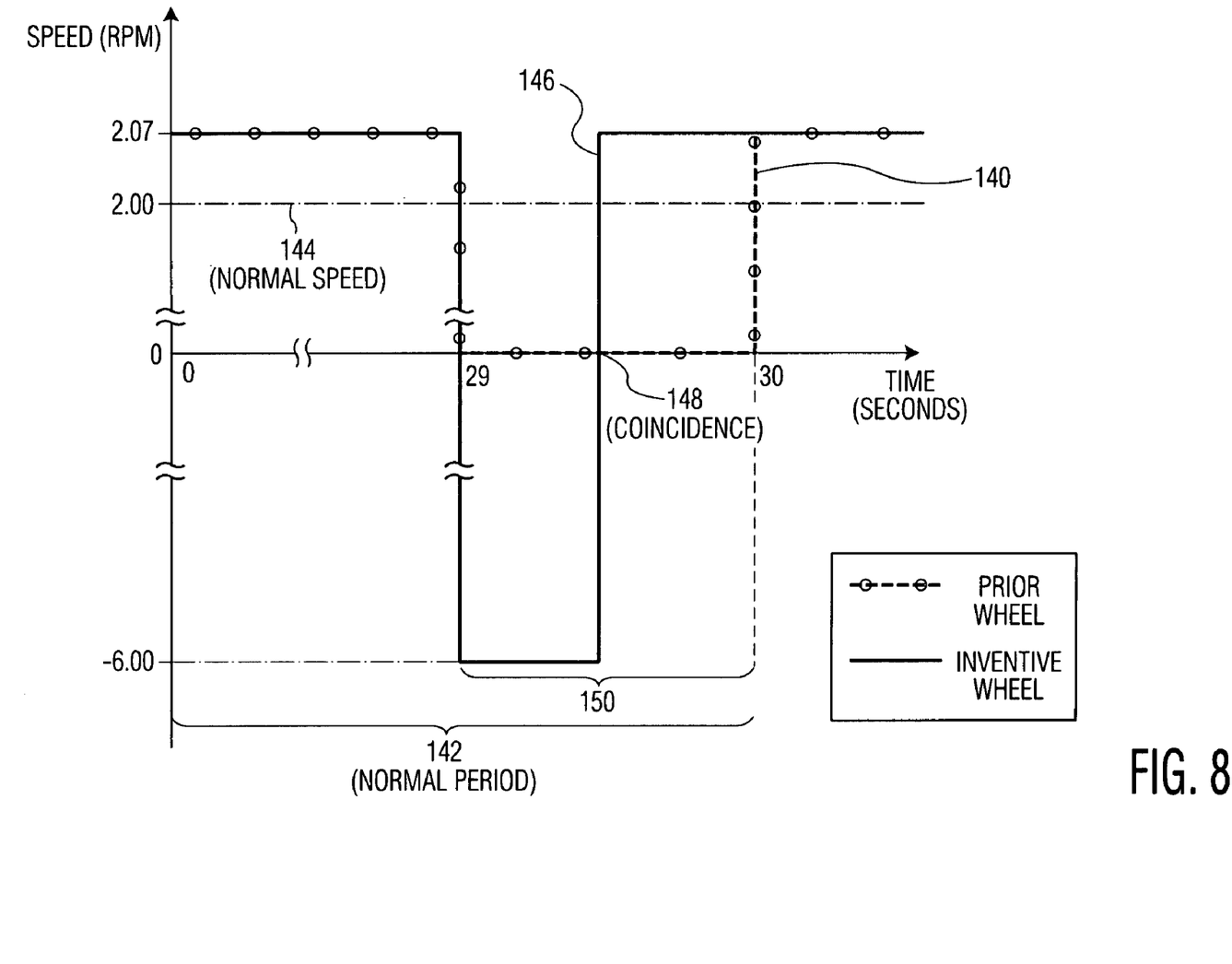
FIG. 8 shows graphs of speed of optical filter and virtual wheels versus time for an inventive embodiment and a prior art embodiment.

FIG. 8 shows various graphs for explaining one way to have an optical filter wheel of an inventive embodiment mimic the movement of a color wheel previously sold in the US ("prior wheel"). This is to enable an inventive embodiment to replace a damaged prior wheel and mimic its movement so as to be compatible with other prior wheels.

Thus, FIG. 8 shows a graph 140 for speed over time for a prior light fixture that operates somewhat similarly to the color wheel in Column C of FIG. 3. However, the wheel (not shown) for graph 140 depicts a wheel that rotates faster than a normal speed so that it reaches a "home" position (as defined above) at, for instance, 29 seconds (as noted). This 29-second point is prior to the end of a normal, cyclic (or repeating) period 142 of, for instance, 30 seconds had the wheel rotated at a continuous, normal speed 144 of, for instance, 2.00 RPM. The faster speed is calculated according to 2* (30 sec./29 sec.) RPM=2.07 RPM. Graph 140 shows the prior wheel (not shown) remaining at 0 speed between 29 and 30 seconds.

In FIG. 8, a graph 146 shows one way for an inventive embodiment to closely mimic the behavior of a prior embodiment. As graph 146 shows, an inventive wheel rotates at the same speed as the prior wheel (i.e., at 2.07 RPM), which is faster than normal speed 144 of an associated virtual wheel, for instance. At 29 seconds, for instance, graph 146 shows the inventive wheel stopping its rotation in a forward direction at 2.07 RPM. This achieves a correspondence to graph 140 for the prior wheel, which also stops its rotation in a forward direction. At 29 seconds, with the inventive wheel reaching a home position, according to graph 146, the microprocessor (e.g., (28, FIG. 1) actually reverses the direction of the inventive wheel and rotates the wheel at a fast speed, for instance, of 6 RPM, for about one-half second. This enables a coincidence in position between the virtual and inventive wheels to occur as noted at point 148. Thereafter, the inventive wheel starts rotating again at faster than the normal speed of 2.00 RPM, and at 30 seconds, starts a repeating cycle.

As can be appreciated from FIG. 8, the behavior of an inventive wheel, per graph 146, and a prior wheel, per graph 140, is identical from 0-29 seconds, differing slightly in end stage 150 of only one second. End stage 150 accounts for only the last 3 to 4 percent (i.e., 3.33 percent) of color wheel rotation during period 142. However, the percentage could vary from a larger percentage of 10 to a smaller percentage of, for instance, under 5, or more preferably under 4. The smaller percentage could even be under 2. Given that a color wheel typically has four changing colors, each color lasting for 7.5 seconds during a 30-second period, end stage 150 can be made to occur during the 7.5 seconds of a respective color. In this way, the color behavior of prior and inventive wheels during the end stage can be made indistinguishable from each other.

Thus, the rotational behavior of an inventive wheel can be made to closely mimic that of a prior wheel. This enables a fixture with an inventive wheel to seamlessly replace one of several fixtures using prior wheels.

While the invention has been described with respect to specific embodiments by way of illustration, many modifications and changes will occur to those skilled in the art. It is, therefore, to be understood that the appended claims are intended to cover all such modifications and changes as fall within the true scope and spirit of the invention.

What is claimed is:

1. A method of making an optical filter wheel of a device synchronizable with an internal, rotatable virtual reference wheel of the device, the method comprising:
   a) creating an internal, rotatable virtual reference wheel in a memory of a motor controller of the device; rotation of the virtual reference wheel being initialized by a single trigger event;
   b) the controller determining the angular orientation of an optical filter wheel of the device and maintaining an ongoing representation of said angular orientation over time; and
   c) the controller controlling the motor to cause the filter wheel to assume a position and velocity that is coincident with the virtual reference wheel after occurrence of the trigger event.

2. The method of claim 1, wherein the controller determining the angular orientation includes using a sensor to determine said angular orientation.

3. The method of claim 1, wherein, after coincidence with the virtual wheel, the optical filter wheel rotates faster than the virtual wheel so as to reach a home position within the last 10 percent of a cyclic period of the virtual wheel when the virtual wheel constantly rotates at a constant speed.

4. The method of claim 1, wherein, after coincidence with the virtual wheel, the optical filter wheel rotates faster than the virtual wheel so as to reach a home position within the last 5 percent of a cyclic period of the virtual wheel when the virtual wheel constantly rotates at a constant speed.

5. The method of claim 1, wherein the controller determining the angular orientation includes determining an initial orientation, after the trigger event, by recalling said orientation from memory.

6. A self-contained light fixture with an optical filter wheel synchronizable with an internal, rotatable virtual reference wheel of the fixture, comprising:
   a) a housing that encloses the working components of the fixture;
   b) an optical filter wheel driven by an electric motor;
   c) a light-emitting device positioned within the device to pass light through the filter wheel;
   d) a control circuit creating an internal, rotatable virtual reference wheel in memory, rotation of the virtual reference wheel being initialized by a single trigger event;
   e) the control circuit determining the angular orientation of the filter wheel and maintaining an ongoing representation of said angular orientation over time; and
   f) the control circuit controlling a motor to cause the filter wheel to assume a position and velocity coincident with the virtual reference wheel after occurrence of the trigger event.

7. The light fixture of claim 6, wherein the controller determines an initial angular orientation of the filter wheel, after the trigger event, by recalling said orientation from memory.

8. The light fixture of claim 6, wherein the light fixture comprises a single conduit which enters the housing to supply power.

9. The light fixture of claim 6, further comprising means for sealing the housing against water so that the light fixture can operate underwater.

10. The light fixture of claim 6, further comprising means for connecting to a fiberoptic cable in such manner that the cable receives light from the light-emitting device.

11. The light fixture of claim 6, wherein, after coincidence with the virtual wheel, the control circuit causes the optical filter wheel to rotate faster than the virtual wheel so as to reach a home position within the last 10 percent of a cyclic period of the virtual wheel when the virtual wheel constantly rotates at a constant speed.

12. The light fixture of claim 6, wherein, after coincidence with the virtual wheel, the control circuit causes the optical filter wheel to rotate faster than the virtual wheel so as to reach a home position within the last 5 percent of a cyclic period of the virtual wheel when the virtual wheel constantly rotates at a constant speed.

13. The combination of the self-contained light fixture of claim 6, and another self-contained light fixture comprising:
   a) a housing that encloses the working components of the fixture;
   b) an optical filter wheel driven by an electric motor;
   c) a light-emitting device positioned within the device to pass light through the filter wheel;
   d) a control circuit creating a rotatable wheel in memory, rotation of the virtual wheel being initialized by a single trigger event;
   e) the control circuit determining the angular orientation of the filter wheel and maintaining an ongoing representation of said angular orientation over time; and
   f) the control circuit controlling a motor to cause the filter wheel to assume a position and velocity coincident with the virtual wheel after occurrence of the trigger event.

* * * * *

UNITED STATES PATENT AND TRADEMARK OFFICE
CERTIFICATE OF CORRECTION

PATENT NO. : 7,348,742 B2  Page 1 of 1
APPLICATION NO. : 11/186556
DATED : March 25, 2008
INVENTOR(S) : Laszlo A. Takacs et al.

It is certified that error appears in the above-identified patent and that said Letters Patent is hereby corrected as shown below:

On the Title Page Item (75)

Originally named inventor:   Laszlo A. Takacs should read

Correctly named inventors should read:   Laszlo A. Takacs
Roger F. Buelow II

Signed and Sealed this

Twenty-second Day of June, 2010

David J. Kappos
*Director of the United States Patent and Trademark Office*